Patented Oct. 15, 1929

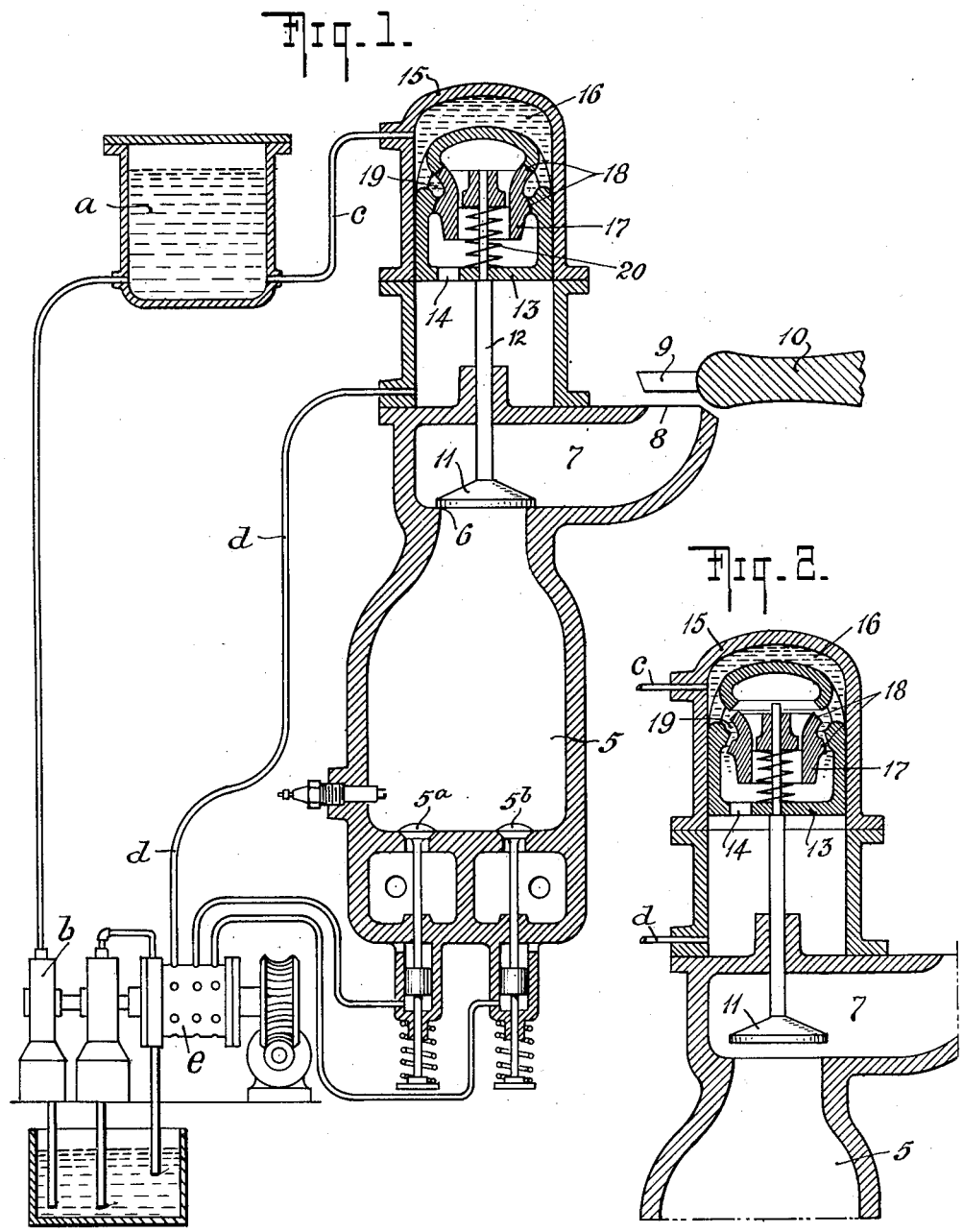

1,731,778

UNITED STATES PATENT OFFICE

HANS HOLZWARTH, OF MULHEIM, GERMANY, ASSIGNOR TO HOLZWARTH GAS TURBINE CO., OF SAN FRANCISCO, CALIFORNIA, A CORPORATION OF DELAWARE

VALVE FOR GAS TURBINES

Application filed August 23, 1921, Serial No. 494,642, and in Germany November 18, 1918.

(GRANTED UNDER THE PROVISIONS OF THE ACT OF MARCH 3, 1921, 41 STAT. L., 1313)

My invention relates to gas or explosion turbines and more particularly to the nozzle-controlling valves thereof. Because of the fact that the products of the explosions, in such turbines, in order to be of maximum efficiency as propelling mediums, must not be subjected to any throttling action in passing from the explosion chamber to the nozzle, such nozzle-controlling valves are generally of relatively large dimensions. On the other hand, it is necessary that such valves provide an efficient seal for the explosion chamber as the latter is charged with fuel and air, in order to avoid loss of the mixture by leakage. In existing constructions, the closing of said control valves and the fixing thereof in their closed positions is effected by means of oil under pressure which acts continuously, generally upon a piston rigidly connected with the control valve. To secure efficient operation such control valves must open automatically and with great speed after the mixture is ignited and exploded, this opening being generally effected by the force of the explosion upon the valve itself. In order to keep the valve open for the time required for a complete discharge of the combustion gases and for the subsequent scavenging, oil pressure is applied to the piston from that side which is opposite to the side on which the oil under constant pressure acts. As the oil under continuous pressure is supplied by means of a relatively narrow and long conduit to the cylinder in which the piston is arranged, the oil column prevailing in said conduit and in the cylinder causes a considerable counter-pressure owing to its inertia when the valve is suddenly to be opened by action of the explosion. This counter-pressure tends to retard the opening of the combustion valve. A slow opening of this valve is objectionable, however, because it causes losses in energy due to a throttling of the current of combustion gases.

One object of the instant invention is an arrangement which permits the fluid column prevailing above the piston and in the conduit leading to the source of continuous pressure to remain stationary when the valve is opened, so that no counter-pressure is developed by the inertia of the fluid. My invention will be fully described hereinafter and the features of novelty will be pointed out in the appended claims.

The accompanying drawing illustrates, diagrammatically, an example of my invention without defining its limits.

In said drawing, Fig. 1 is a vertical section through an explosion chamber and its associated nozzle valve constructed in accordance with the present invention, the valve operating mechanism being shown in elevation; and Fig. 2 is a partial view illustrating the position of the nozzle valve immediately after an explosion in the combustion chamber.

It will be understood that the general construction and arrangement of the turbine may be of any suitable type and include any and all features commonly included in turbines of the indicated character and that only so much of the turbine has been included in the drawing as is necessary to illustrate the invention. In said drawing 5 represents an explosion chamber of suitable construction to which fuel and air are admitted in the well known way by means of conventional valves $5^a$ and $5^b$ and which leads, by way of a valve seat 6, to a nozzle channel 7 terminating in a nozzle 8. The latter is located in operative relation to the buckets 9 of the rotor 10 of the turbine which, in the illustrated example, is of the horizontal type carried by a vertical shaft in the well known way.

A combustion valve 11 co-operates with the seat 6 to control the communication between the explosion chamber and the nozzle channel 7 and is rigidly mounted upon a stem 12 which, in turn, is rigidly connected with a movable wall constituted in the present instance by a piston 13. The latter is provided with a vent 14 and is slidably mounted in a cylinder 15 the outer end of which contains a supply of oil 16 under pressure, obtained from a source of oil, such as, for instance, a tank $a$ connected with an oil pump $b$ with which by means of a pipe $c$ said chamber is suitably connected. It will be seen that the said movable wall or piston 13 forms one of the walls of the chamber 15. An auxiliary valve 17 is located within the piston 13 and by means of seats 18 controls openings 19 therein, said auxiliary valve being slidably mounted upon an extension of the stem 12 and being maintained in and returned to its normal position by means of a spring 20. That is to say, the spring 20 is of sufficient strength to close the auxiliary valve 17 as will appear more fully hereinafter.

With the present arrangement, as an explosion takes place in the explosion chamber 5, the valve 11 is thrown thereby from its seat 6 at high speed and correspondingly actuates the piston 13 with which said valve is rigidly connected, as shown in Fig. 2. The auxiliary valve 17, in the first instance, however, takes no part in this operation, but is held stationary by its inertia, while the piston is moving outwardly so that the compression of the spring 20 is increased; as this movement of the piston relatively to the auxiliary valve takes place, the oil 16 passes through the openings 19 to the interior of the piston 13 and finally flows out through the vent 14 and back through a pipe $d$ and conventional distributor $e$ to the source of supply. When the inertia of the comparatively large mass which constitutes the auxiliary valve 17 is finally overcome and the latter partakes of the accelerated movement of the piston, the spring 20 will again return the auxiliary valve to its closed position and shut the openings 19. During the interim in which the above relative operations of the piston and auxiliary valve take place the oil passes through the piston and its vent 14 and thus exerts comparatively little effect upon said piston. The latter thereby encounters very slight resistance so that the required speedy opening of the control valve 11 is efficiently effected.

In order to keep the valve open for a predetermined period of time, oil under pressure is temporarily applied to the lower side of the double-acting piston 13 through pipe $d$, which leads to distributer $e$. The distributer which connects the pipe $d$ at predetermined times alternately with a source of oil under pressure and with an oil pool without pressure, may be of the type shown and described in my Patent No. 877,194. The distributer controls furthermore the valves $5^a$ and $5^b$ in a well-known manner which has also been described in my afore-mentioned patent. The manner of keeping the valve 11 open for a predetermined length of time by means of oil under pressure fed by the distributor $e$ into the portion of the cylinder below the piston 13 is clearly described in said patent and forms no part of the present invention.

The oil pressure above the piston 13 and the pressure of the mixture within the explosion chamber 5 upon the valve 11 may assume any and varied degrees without affecting the operation of the device. The auxiliary valve 17, for the purposes of the invention, represents a relatively large mass and is perfectly balanced, as will be apparent. That is to say, the valve 17 at the portion or surface in contact with the oil 16 is so formed that the upward pressure of the oil on the valve will be exactly equal to the downward pressure; for this purpose the outer diameters of the two portions of the valve which engage the seats 18 are equal. The pressure of the oil in chamber 15 will therefore have no tendency to move the valve 17 in either direction.

The device is simple in construction and operation and provides an efficient means for controlling the communication between the explosion chambers and the nozzles. It will, of course, be understood that a gas turbine embodying my invention operates in the well known way.

Various changes in the specific form shown and described may be made within the scope of the claims without departing from the spirit of my invention.

I claim:

1. An exhaust valve arrangement suitable for use in controlling the discharge of combustion gases through the outlet of an explosion chamber and adapted to be opened by the force of the explosion in such chamber comprising an exhaust valve, a cylinder, a piston therein operatively connected with said valve to actuate the same, a conduit leading from a source of fluid under pressure to the outer end of said cylinder whereby the fluid tends to keep said valve closed, said piston being provided with a through passage, an auxiliary balanced valve controlling the same, and resilient means tending to close said auxiliary valve, said auxiliary valve being so mounted in said piston that it performs a movement relatively thereto by its inertia, upon the rapid movement of the exhaust valve and the corresponding rapid movement of the piston, whereby said through passage is opened and said piston is relieved from the counter-pressure of the fluid under pressure.

2. An exhaust valve arrangement suitable for use in controlling the discharge of combustion gases through the outlet of an explosion chamber and adapted to be opened by the force of the explosion in such chamber comprising an exhaust valve, a cylinder, a piston therein operatively connected with said valve to actuate the same, the cylinder being provided with a port, a source of actuating fluid of continuous pressure, a conduit connecting said source to said port whereby the fluid tends to keep said valve closed, the piston being provided with a through passage, an auxiliary balanced valve controlling the same, and an elastic connection between said piston and said auxiliary valve tending to maintain the latter in its closed position, said auxiliary valve being so mounted in said piston that upon the rapid opening of the exhaust valve and the corresponding rapid movement of the piston a relative movement between said auxiliary valve and said piston takes place as a result of the inertia of said auxiliary valve, whereby said through passage is opened and the piston is relieved from the inertia counter-pressure of the oil of continuous pressure.

3. An exhaust valve arrangement suitable for use in controlling the discharge of combustion gases through the outlet of an explosion chamber and adapted to be opened by the force of the explosion in such chamber comprising an exhaust valve, a cylinder, a piston therein operatively connected with said valve to actuate the same, the cylinder being provided with a port, a source of actuating fluid of continuous pressure, a conduit connecting said source to said port whereby the fluid tends to keep said valve closed, the piston being provided with a through passage, said through passage having spaced seats of substantially equal diameters, a balanced auxiliary valve cooperating with both seats to control said through passage, and elastic means tending to seat said auxiliary valve, the latter being so mounted in said piston that upon the rapid opening of the exhaust valve and the corresponding rapid movement of the piston a relative movement between said auxiliary valve and said piston takes place as a result of the inertia of said auxiliary valve, whereby said through passage is opened and the piston is relieved from the inertia counter-pressure of the oil of continuous pressure.

4. An exhaust valve arrangement suitable for use in controlling the discharge of combustion gases through the outlet of an explosion chamber and adapted to be opened by the force of the explosion in such chamber comprising an exhaust valve, a cylinder, a piston therein, a stem connecting said piston with said exhaust valve, the cylinder being provided with a port, a source of actuating fluid of continuous pressure, a conduit connecting said source to said port whereby the fluid tends to keep said valve closed, the piston being provided with a through passage, a balanced auxiliary valve located within said piston and controlling said through passage, said auxiliary valve being slidably mounted on said stem and of such inertia that it remains temporarily stationary upon the rapid opening of the exhaust valve and the corresponding rapid movement of said piston to open the through passage of the latter for the passage of said fluid therethrough, and a spring interposed between said piston and auxiliary valve and tending to close the latter.

In testimony whereof I have hereunto set my hand.

HANS HOLZWARTH.